Patented May 1, 1951

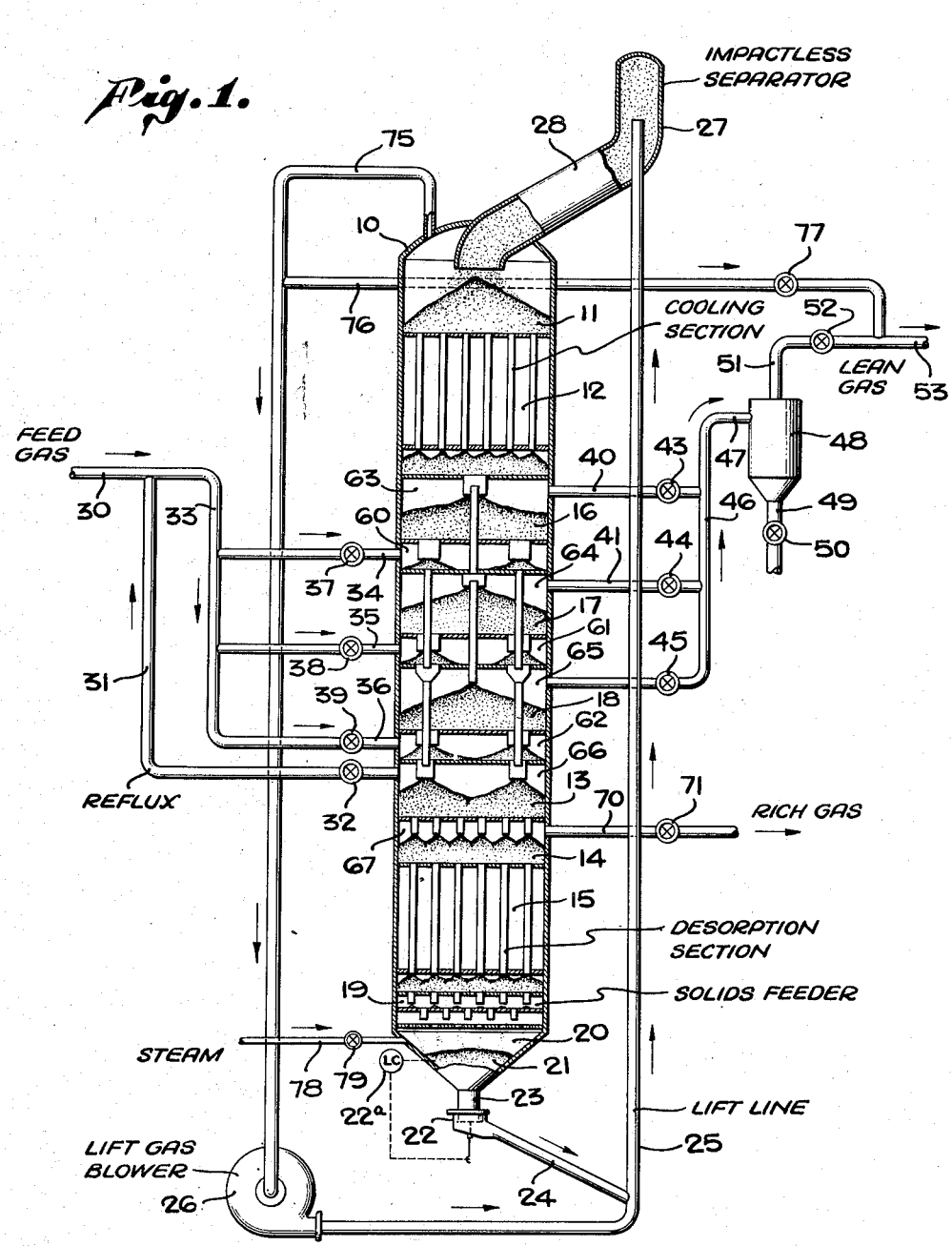

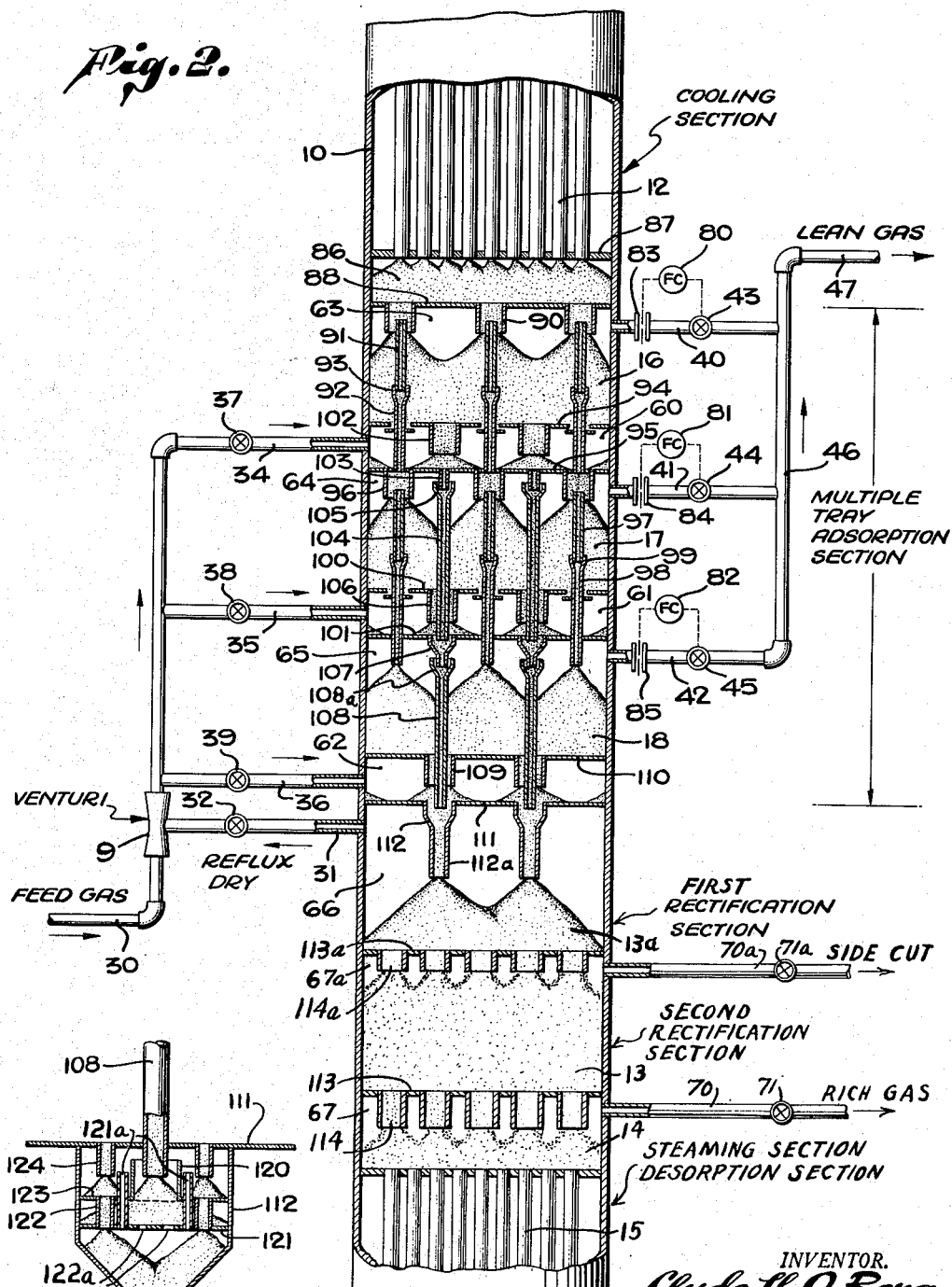

2,550,955

UNITED STATES PATENT OFFICE 2,550,955

ADSORPTION PROCESS AND APPARATUS

Clyde H. O. Berg, Long Beach, Calif., assignor to Union Oil Company of California, Los Angeles, Calif., a corporation of California Application February 21, 1947, Serial No. 730,166

23 Claims. (Cl. 183—4.2)

This invention relates to a process and apparatus for the continuous separation of normally gaseous mixtures by selective adsorption of certain constituents of such mixtures on solid granular adsorbents and applies particularly to the separation of gaseous mixtures containing relatively small amounts of those constituents which are more readily adsorbable on granular charcoal.

The separation of a light gaseous mixture into its constituent parts by the process of selective adsorption offers many advantages over the conventional separation processes of distillation, extraction, etc. In applying the processes of distillation or extraction to the separation of gaseous mixtures containing constituents of relatively low molecular weight, elevated pressures are required together with abnormally low temperatures to condense the gas into a liquid so that it may be separated by these processes. For example, in the preparation of pure ethylene by fractional distillation of ethylene-bearing stocks, a fractionator pressure of 385 pounds per square inch and a reflux temperature of —5° F. are required. In the preparation of pure methane by a similar process a pressure between 500 and 600 pounds per square inch and a reflux temperature of —150° F. are required. The compression and refrigeration of light gaseous mixtures to permit separation by distillation or extraction are expensive operations and consequently large quantities of gaseous mixtures containing these and other light compounds are often wasted rather than to perform expensive recovery operations.

The conventional process of gas absorption has disadvantages which often render it inapplicable to the separation of light gaseous mixtures because generally the gases of low molecular weight are less soluble in the absorbing medium used in adsorbing compounds of the same class having higher molecular weights. Thus, high pressures of operation are also required in absorption processes in order to obtain an appreciable concentration of the light gaseous compound in the absorbing medium and to avoid circulation of large quantities of the absorbing medium through the system.

I have previously proposed a method for the separation of gaseous mixtures containing constituents which are difficultly liquefiable because of low critical temperatures and constituents which are not readily soluble in commonly used solvents. By this method such gaseous mixtures may be conveniently and economically separated at moderate temperatures and pressures which involves the application of selective adsorption and desorption.

In general, my previously proposed process of separating gaseous mixtures by continuous selective adsorption on a granular solid adsorbent involves the steps of countercurrently contacting the gaseous mixture with a moving bed of the adsorbent, thereby adsorbing from the mixture those constituents which are more readily adsorbable and leaving as a substantially unadsorbed gas those constituents which are less readily adsorbable. In a moving bed operation, the adsorbent upon which certain of the gaseous constituents have been adsorbed flows from an adsorption section into a stripping or desorption section wherein the adsorbent is heated and contacted with a stripping gas, such as steam for example, to cause the adsorbed constituents to be liberated. The adsorbent, freed of adsorbed constituents, is subsequently cooled prior to repassage through the adsorption section. In this proposed process of selective adsorption a gaseous mixture may be divided into two separate fractions consisting of a rich gas containing the more readily adsorbable constituents having the higher molecular weight or critical temperature and a lean gas containing the less readily adsorbable constituents having the lower molecular weight or critical temperature. The rich gas is obtained by adsorption and subsequent desorption of the more readily adsorbable constituents and the lean gas is obtained by removal from the adsorption section of the less readily adsorbable constituents as a substantially unadsorbed gas.

In a recently proposed improvement in the art of separation of gaseous mixtures by selective adsorption, an adsorption column has been provided which contains two or more rectification sections which permits the separation of the gaseous mixtures into more than two fractions. Such operations are made possible by the utilization of a refluxing step within these rectification sections permitting production not only of the lean and rich gases cited above, but also one or more intermediate fractions containing constituents which are of intermediate adsorbability.

By modifications of the previously proposed processes involving selective adsorption almost any gaseous mixture containing constituents of low molecular weight or low critical temperature may be conveniently handled and separated into a multiplicity of fractions. The process of selective adsorption is particularly applicable to the separation of gaseous mixtures containing relatively small percentages of the more readily adsorbable constituents, such as those with higher molecular weights or critical temperatures, and it is to the improvement of the last-named operation that my invention, which is hereinafter more fully described, is directed.

Such gaseous mixtures containing relatively small amounts of the more readily adsorbable constituents occur frequently in industrial practice. The separation of certain constituents from this type of gaseous mixture may be exemplified by the recovery of vaporized solvents from air, the recovery of natural gasoline from the natural gas produced simultaneously with crude petroleum, the recovery of carbon dioxide from flue gases, the recovery of sulfur dioxide and sulfur trioxide from sulfur burner flue gases, the recovery of the equilibrium mixture nitrogen tetroxide-nitrogen dioxide occurring in the effluent gases from catalytic air oxidation of ammonia, the separation of light hydrocarbon gases, such as, methane, or the separation of oxygen, nitrogen, carbon monoxide, carbon dioxide, and water vapor contaminants from impure hydrogen, and many other gaseous mixtures. My process is equally effective in the recovery of either the major or minor proportions of such gaseous mixtures or both provided that the more readily adsorbable constituent is in the minor proportion, for example, less than about 30 volume per cent. It is particularly well adapted to the separation of gaseous mixtures wherein the more readily adsorbable constituent is present in concentrations less than 15 volume per cent.

In the separation by selective adsorption of such gaseous mixtures containing relatively small amounts of the more readily adsorbable constituents as indicated above, the amount of adsorbent required for each unit volume of the gaseous mixture being separated is relatively small and the volume of gas which passes through the selective adsorption unit, and which is substantially unadsorbed, is relatively large. In order to properly design selective adsorption units which will efficiently handle gaseous mixtures containing considerable proportions of gases which are substantially unadsorbed by the adsorbent, a relatively large cross-sectional area must be provided in the selective adsorption unit at the point in which the critical gas velocity exists. In units designed to treat the type of gaseous mixtures indicated above, this point of critical gas velocity exists in the adsorption section where the gas to be separated is introduced.

In addition, a substantially complete adsorption of the minor amount of more readily adsorbable constituent must be insured in order to produce fractions of the gaseous mixture being treated which are of high purity. The maintenance of a moderate gas velocity through the adsorbent in the adsorption section serves to insure the complete adsorption of the more readily adsorbable constituents, and may be accomplished by providing an adsorption section having a relatively large cross-sectional area. This requirement of a large cross-sectional area in the selective adsorption unit necessitates the use of adsorption towers of relatively large diameter. Because selective adsorption towers are generally between about 70 and 120 feet in height, the construction of a number of large diameter selective adsorption towers to separate large volumes of a given gaseous mixture is of considerable expense.

It is a particular object to provide an improved selective adsorption process directed to the separation of gaseous mixtures in which the more readily adsorbable constituents of such gaseous mixtures are present in relatively low concentrations.

Another object of my invention is to provide an improved selective adsorption process by which such gaseous mixtures may be separated with higher recoveries and at increased economies than heretofore possible.

It is still a further object of my invention to provide in the selective adsorption process an improved apparatus which is particularly adapted to the separation of gaseous mixtures containing relatively small amounts of the more readily adsorbable constituents.

Other objects and advantages of this invention will become apparent to those skilled in the art as the description thereof proceeds.

According to the process of my invention I am able to accomplish the above-mentioned objects by providing in the improved selective adsorption process, as more fully described hereinafter, a selective adsorption tower having an adsorption section of special construction which permits an increase of about 100% in the feed rate to a selective adsorption tower having a given cross-sectional area without impairing either the efficiency or the economy of the process. Furthermore, the special construction of the adsorption section provides a more thorough contact of the adsorbent employed by the gaseous mixture to be separated which results in a more complete and efficient separation with decreased amounts of contaminants in the product streams.

In the selective adsorption tower, the adsorbent such as silica gel, activated alumina, activated charcoal, etc., flows downwardly through a tubular cooling section and through a disengaging section into the adsorption section. The disengaging section consists of a horizontal tray having short tubes extending downward from and attached to the tray in such a manner that the charcoal which flows through the tubes forms a gas space between the lower surface of the tray and the upper surface of the adsorbent flowing from the lower open end of the tubes into the adsorption section. The adsorbent flows downwardly through the adsorption section, through a feed gas engaging section having a construction similar to that of the disengaging section previously described, through a rectification section, through another disengaging section, and subsequently into the tubular desorption section. The feed gas is introduced into the adsorption section through the feed gas engaging section, the more readily adsorbable constituents are adsorbed on the adsorbent and flow downwardly with the adsorbent through the feed gas engaging section, and the less readily adsorbable constituents flow upwardly through the adsorption section and are removed from the adsorbent bed through the disengaging section situated just below the cooling section. The adsorbent containing the more readily adsorbable constituents flows downwardly eventually into the desorption section wherein the adsorbed constituents are removed from the adsorbent forming a lean adsorbent and the desorbed constituents pass upwardly into the disengaging section directly above the desorption section and are removed from the system.

The multiple tray and adsorption section of special construction in my improved selective adsorption process comprises an adsorption section containing a multiplicity of adjacent and separate adsorption zones disposed in vertical relationship in the selective adsorption tower. Each of these zones is provided with individual feed gas engaging and lean gas disengaging sections. The adsorption zones are so arranged so that each receives cooled lean adsorbent from above and each discharges rich adsorbent saturated with the more readily adsorbable constituents of the feed gas through the rectification section and into the desorption section situated below. The lean adsorbent, removed from the desorption section after removal of the adsorbed constituents, is introduced into the cooling section in the upper portion of the selective adsorption tower and cooled in the cooling section to a temperature suitable for adsorption.

The process and apparatus of my invention may be more clearly understood by reference to the accompanying drawings in which, Figure 1 is a diagrammatic illustration of the apparatus in which my improved selective adsorption process may be carried out, and Figure 2 is a diagrammatic illustration showing in detail the adsorption section of special construction. In Figure 2 the multiple tray adsorption section is shown to include three adsorption zones each provided with separate inlets and outlets for gas flow and with separate inlets and outlets for adsorbent flow.

Figure 3 is a diagrammatic illustration of one modification of charcoal flow controllers 107 and 112 of Figure 2.

In the following description of my invention the process and apparatus will be more fully described for purposes of greater clarity as employing charcoal as the adsorbent and utilizing as feed 110,000 m. s. c. f./d. of a specific gaseous mixture of the lower molecular weight hydrocarbons having the following composition:

| Component | Volume Per Cent | Rate m. s. c. f./d. |
| --- | --- | --- |
| Methane | 94.0 | 103,400 |
| Ethane | 3.0 | 3,300 |
| Propane | 0.7 | 770 |
| Butanes, and heavier | 2.3 | 2,530 |
| | 100 | 110,000 |

The selective adsorption tower containing a multiple-tray adsorption section required for this separation is 12'-0" in diameter and is approximately 110' high. The rate of charcoal circulation is 91.5 pounds per m. s. c. f. of gaseous feed, or 420,000 pounds per hour. The feed gas enters at a pressure of 550 pounds per square inch and at about 105° F.

103,600 m. s. c. f./d. of a leans gas comprising substantially pure methane may be prepared having the following composition:

| Component | Volume Per Cent | Rate m. s. c. f./d. |
| --- | --- | --- |
| Methane | 99.5 | 103,200 |
| Ethane | 0.4 | 320 |
| Propane | 0.1 | 80 |
| | 100 | 103,600 |

The methane recovery is better than 99 volume per cent.

6,300 m. s. c. f./d. of a rich gas containing the more readily adsorbable constituents is produced having the following composition:

| Component | Volume Per Cent | Rate m. s. c. f./d. |
| --- | --- | --- |
| Methane | 3.2 | 200 |
| Ethane | 45.7 | 2,880 |
| Propane | 11.0 | 690 |
| Butane and heavier | 40.1 | 2,530 |
| | 100 | 6,300 |

Referring more particularly to Figure 1, a vertical cross section of the apparatus of my invention is shown, in which the improved selective adsorption process according to my invention may be carried out. Adsorption tower 10 is equipped with charcoal hopper 11, cooling section 12, rectification section 13, steaming section 14, and desorption section 15. Between the lower extremity of cooling section 12 and above rectification section 13 is disposed the multiple tray adsorption section of my invention. As indicated in Figure 1 the multiple tray adsorption section consists of three adsorption zones—16, 17 and 18, one placed above the other.

The charcoal flows through the system at a rate of 420,000 pounds per hour controlled by solids feeder 19 positioned directly below desorption section 15. Solids feeder 19 discharges charcoal into bottom zone 20 in which is maintained a charcoal level 21 by means of charcoal valve 22 and level control 22a positioned in outlet line 23 from the bottom of adsorption tower 10. The charcoal flowing through valve 22 flows downwardly by gravity through transfer line 24 and is introduced into charcoal lift line 25 where it meets an upwardly flowing stream of gas forming a charcoal-gas suspension. Under a pressure induced by lift gas blower 26 the suspension is elevated through lift line 25 to impactless separator 27 located at a point somewhat higher than the upper end of adsorption tower 10. Because of the greater cross-sectional area provided in separator 27 for gas flow, the gas-charcoal suspension is broken and the granular charcoal flows as a continuous phase together with the separated gas through transfer line 28 and is introduced into charcoal hopper 11 in the upper portion of adsorption tower 10. The temperature of the charcoal as it is introduced into hopper 11 is quite high, varying between about 200° F. and 600° F. depending upon the type of feed stock being separated. This hot charcoal flows downwardly through the tubes contained in cooling section 12 wherein it is cooled by indirect heat exchange with cooling water or other suitable cooling medium flowing outside the tubes. The charcoal flowing from cooling section 12 has been cooled at a temperature varying between about 90° F. and 175° F. rendering it suitable for repassage through adsorption zones 16, 17 and 18.

The gaseous mixture to be separated, having the analysis previously given and containing a relatively small proportion of constituents which are more readily adsorbable by the charcoal, is introduced at a pressure of 550 pounds per square inch gauge into selective adsorption tower 10 by means of line 30. A certain amount of gaseous reflux, consisting of a gas desorbed in rectification section 13 which contains a high concentration of methane together with some of the more readily adsorbable constituents of the gaseous mixture is combined with the gaseous mixture in line 30 by means of line 31 controlled by valve 32 to form an enriched feed. The enriched feed flowing through line 33 is divided into three approximately equal fractions one each of which is introduced into one of the three adsorption zones 16, 17 and 18 by means of lines 34, 35 and 36, controlled by valves 37, 38 and 39, through engaging sections 60, 61 and 62, respectively. The particular construction of the adsorption zones, as hereinafter more fully described, substantially completely prevents the gas introduced into one adsorption zone from flowing into one or both of the adjacent adsorption zones. The enriched feed gas introduced into each of the adsorption zones previously described flows upward through the bed of downwardly flowing charcoal maintained in each adsorption zone and into the free space of disengaging sections 63, 64 and 65, formed between the upper surface of the charcoal bed and the tray immediately above in each adsorption zone. During passage of the enriched feed through the charcoal bed in each adsorption zone the more readily adsorbable constituents, those heavier than methane and including those present in the original gaseous mixture together with those added as reflux to form the enriched feed, are adsorbed on the adsorbent in each adsorption zone to form a rich charcoal. The methane in the enriched feed, being less readily adsorbable than the higher molecular weight constituents, moves upwardly through the adsorption zones as a substantially unadsorbed gas and is removed as a lean gas from disengaging sections 63, 64 and 65. The lean gas is removed from adsorption zones 16, 17 and 18 by means of lines 40, 41 and 42, controlled by valves 43, 44 and 45, respectively. The three streams of lean gas thus removed are combined in header 46 and conducted by means of line 47 to cyclone separator 48 wherein traces of the granular adsorbent are removed from the lean gas stream. These traces of charcoal are removed from separator 48 by means of line 49 controlled by valve 50. The lean gas containing 99.5 volume per cent methane is removed from separator 48 by means of line 51 controlled by valve 52, across which is maintained a pressure drop of between about 5 and 50 pounds per square inch, and is removed from the system as substantially pure methane by means of line 53 and sent to storage or equipment for further processing, not shown, at a rate of 103,600 m. s. c. f./d.

A portion of the lean gas not removed from disengaging section 63 flows upwardly through the tubes of the upper tray of disengaging section 63, upwardly through the tubes of cooling section 12 serving therein to remove traces of moisture from the charcoal being cooled and to saturate the charcoal with methane. Subsequently, the lean gas passes upwardly through the charcoal in hopper 11 into the free space in the upper portion of adsorption tower 10 where it is combined with lean gas separated in impactless separator 27 from the lean gas-charcoal suspension. The lean lift gas is removed from the upper portion of adsorption tower 10 by means of line 75 which serves as a return line to lift gas blower 26 completing the lift gas cycle. Because of the methane flowing upwardly through cooling section 12, line 76 is provided and controlled by valve 77 to remove accumulations of that gas in the lift gas cycle. Valve 77 discharges into line 53 on the low pressure side of valve 52 and allows a flow of methane through line 76 which is sufficient to maintain an upward flow of methane through cooling section 12.

The rich charcoal formed in adsorption zones 16, 17 and 18 through the adsorption thereon of the more readily adsorbable constituents of the enriched feed flows downwardly out of each adsorption zone and is introduced into rectification section 13. Herein the rich charcoal is contacted by additional quantities of the more readily adsorbable constituents which are liberated from the charcoal in desorption section 15 and flow upwardly countercurrent to the downwardly flowing rich charcoal serving to desorb small quantities of methane from the rich adsorbent present in rectification section 13. The desorbed methane flows upwardly into disengaging section 66 from which it is removed by means of line 31 controlled by valve 32 and is introduced into line 30 together with the reflux stream described to form the enriched feed. The rectified charcoal present in rectification section 13 flows downwardly through the tubes of rich gas disengaging section 67 and into steaming section 14 disposed directly above desorption section 15. In steaming section 14 and in the upper portion of the tubes of desorption section 15 the downwardly flowing charcoal containing the more readily adsorbable constituents of the gaseous mixture is heated and contacted therein with a countercurrent stream of a stripping gas such as for example, steam. Because of the preferential adsorption of steam over that of nearly all other gases, the adsorbed constituents on the charcoal are desorbed when the steam is adsorbed on the charcoal and the thus desorbed constituents move upwardly through the tubes of desorption section 15 into rich gas disengaging section 67, and the adsorbed steam moves downward into the desorption zone with the charcoal. A portion of the desorbed constituents pass upward through the tubes of disengaging section 67 into rectification section 13 and serve therein as an internal reflux to effect desorption from the adsorbent of small quantities of methane and are removed together with the methane from disengaging section 66 and used as reflux to form the enriched feed. The remainder of the more readily adsorbable constituents desorbed in desorption section 15 flow into the free space of disengaging section 67 and are removed therefrom by means of line 70 controlled by valve 71 and are removed from the system at a rate of 6300 m. s. c. f./d.

The charcoal containing the adsorbed steam is heated in desorption section 15 to a temperature sufficient to cause a substantially complete removal therefrom of steam which moves upward through the desorption section 15 to again cause adsorbed gas desorption in steaming section 14 completing an internal stripping steam recycle. A small amount of the stripping gas generally finds its way upward through steaming section 14 and is removed together with the rich gas through line 70 and further small amounts of the stripping gas are adsorbed on and removed with the charcoal flowing from the bottom of desorption section 15. In order to maintain the required amount of steam or other stripping gas in adsorption section 15, a small amount of the stripping gas is added by means of line 78 controlled by valve 79 into bottom zone 20 situated below solids feeder 19. In desorption section 15 when the more readily adsorbable constituents are removed from the charcoal in the upper portion thereof, steam or other stripping gas is adsorbed on the lean charcoal and flows downwardly with the charcoal through the desorption section into regions therein of higher temperature. A temperature is maintained in the lower portion of desorption section 15 which is sufficient to cause substantially complete desorption of the stripping gas from the charcoal so that the former will pass upwardly through the tubes of the desorption section and effect desorption of more readily adsorbable constituents in the upper cooler portions of desorption section 15. The charcoal, thus freed of more readily adsorbable constituents and containing very small amounts of the stripping gas adsorbed thereon, passes downward through solids feeder 19, bottom zone 20, line 23, controlled by charcoal valve 22 and through transfer line 24 into lift line 25 for return to the upper portion of selective adsorption tower 10, thus completing the charcoal cycle. Charcoal valve 22 maintains a charcoal level 21 in bottom zone 20 for two purposes: (1) to prevent the reverse flow of lean lift gas upward from lift line 25 through transfer line 24, line 23 controlled by valve 22 into bottom zone 20 of adsorption tower 10 which would cause contamination of the rich gas removed from the desorption section by the less readily adsorbable constituents contained in the lean lift gas; and, (2) to effectively prevent the downward flow of steam or other stripping gas introduced into bottom zone 20 from flowing downwardly with the charcoal into lift line 25, for such amounts of steam or other stripping gas have a tendency to collect on the charcoal in the cooler portions of cooling section 12 markedly altering the flow characteristics of the charcoal.

Referring more particularly to Figure 2, wherein like parts are indicated with the same reference numbers as in Figure 1, a multiple tray adsorption section containing three adsorption zones is shown in a selective adsorption column. Feed gas enters by means of line 30, is enriched by means of reflux flowing through line 31 controlled by valve 32 to form an enriched feed, is divided into three substantially equal fractions and introduced into adsorption zones 16, 17 and 18 by means of lines 34, 35 and 36, controlled by valves 37, 38 and 39. The lean gas which contains a high concentration of the methane of the feed gas is removed as previously described from the three adsorption zones by means of lines 40, 41 and 42, controlled by valves 43, 44 and 45, respectively, into header 46 from which the methane is removed by means of line 47 and conveyed to charcoal separating means, as previously described in conjunction with Figure 1, or to equipment for further processing not shown. In order to control the quantity of gas flowing through the individual adsorption zones 16, 17 and 18, valves 43, 44 and 45, respectively, are actuated by controllers 80, 81 and 82, which in turn are activated respectively by flow meters 83, 84 and 85. An accurate control over the amount of gas flowing through each adsorption zone in the multiple tray adsorption section is effected.

The lean charcoal flowing downwardly through the tubes in cooling section 12 is cooled by indirect heat exchange with water or other cooling medium flowing outside the tubes and is saturated therein with methane from the lean gas which flows upwardly countercurrent to the charcoal through the cooling section as previously described. The cooled charcoal flows by gravity into zone 86 which is formed between lower tube sheet 87 of cooling section 12 and primary tray 88 of disengaging section 63. Lean charcoal is introduced from zone 86 into each adsorption zone of the multiple tray adsorption section in a manner which is described as follows:

Primary tray 88 of adsorption zone 16 is provided with primary tubes 90 extending downward therefrom through which flow cooled charcoal from zone 86. Introduced into the lower ends of primary tubes 90 and extending upward a short distance from the lower ends thereof are secondary tubes 91 of smaller diameter than that of primary tubes 90. Secondary tubes 91 convey cooled charcoal downward through and independent of adsorption zone 16 into adsorption zones 17 and 18 below. Cooled charcoal flows from zone 86 downward through primary tubes 90 therein dividing into two streams, the first of which flows through the annuli formed between primary tubes 90 and secondary tubes 91 into adsorption zone 16, and the second which flows at approximately twice the rate as that of the first stream downwardly through secondary tubes 91, through tubes 92 connected to secondary tubes 91 by means of couplings 93 and into adsorption zones 17 and 18 immediately below. Couplings 93 are present in the tubular section consisting of tubes 91 and 92 in order to facilitate the assembling and dismantling of the adsorption section. Tubes 92 pass downward through and are independent of secondary tray 94 and extend downward and are integrally attached to primary tray 95. Tray 95 in adsorption zone 17 is the equivalent to primary tray 88 in adsorption zone 16 immediately above. The cooled charcoal flowing through tubes 92 flows through primary tray 95 and again divides into two streams in primary tubes 96 attached to primary tray 95. Primary tubes 96 attached to primary tray 95 are analogous to primary tubes 90 attached to primary tray 88 in adsorption zone 16 above. The charcoal flowing through tubes 96 divides into two streams; the first flowing through the annuli formed between primary tubes 96 and secondary tubes 97 and flows into adsorption zone 17, the second flowing through secondary tubes 97, and through tubes 98 attached to tubes 97 by means of couplings 99. Tubes 98 pass through and are independent of secondary tray 100, and continue downward and pass through and are integrally attached to primary tray 101 in adsorption zone 18, tubes 98 extending downward below primary tray 101 a short distance into adsorption zone 18. Thus, in the manner just described, lean cooled charcoal is introduced individually in separate streams into the three separate adjacent adsorption zones 16, 17 and 18. Primary tray 88 and the primary tubes 90 attached thereto form disengaging section 63 by means of which the lean gas consisting of less readily adsorbable constituents of the gaseous feed are removed from adsorption zone 16. Similarly, primary tray 95 in adsorption zone 17 and the primary tubes 96 attached thereto form disengaging section 64 by means of which the fraction of lean gas is removed from adsorption zone 17. Primary tray 101 in adsorption zone 18 together with extensions therethrough of tubes 98 form disengaging section 65 from which is removed the third fraction of lean gas from adsorption zone 18.

During passage through each adsorption zone, the cooled charcoal is contacted by a countercurrent stream of gaseous feed together with added reflux and substantially completely adsorbs therefrom the more readily adsorbable constituents together with small amounts of methane present in the enriched gaseous feed to form a rich charcoal. The rich charcoal formed in adsorption zone 16 passes downwardly by gravity through secondary tray 94, through tertiary tubes 102 attached thereto into feed gas engaging section 60 and onto primary tray 95 of adsorption zone 17. Interdisposed on primary tray 95 between primary tubes 96 in a geometrical pattern and integrally attached thereto are quaternary tubes 103. Each of the quaternary tubes 103 on primary tray 95 is disposed directly below each of the tertiary tubes 102 which are attached to secondary tray 94 directly above. Thus, the charcoal flowing downwardly from adsorption zone 16, through tertiary tubes 102 into engaging section 60 continues its downward flow through quaternary tubes 103 attached to primary tray 95 of adsorption zone 17 and downwardly through and independent of adsorption zone 17 by means of quaternary extension tubes 104 connected to quaternary tubes 103 by means of couplings 105. Quaternary extension tubes 104 pass downward through and are independent of secondary tray 100 of adsorption zone 17. The rich charcoal formed in adsorption zone 17 passes downward through secondary tray 100, through the annular spaces formed between quaternary extension tubes 104 and tertiary tubes 106, which latter are integrally attached to secondary tray 100 and are similar to tertiary tubes 102 attached to secondary tray 94 above in engaging zone 60 above, and passes into engaging section 61 and onto primary tray 101. Integrally attached to primary tray 101 and extending downward therefrom an equal distance as do tubes 98 previously described are charcoal flow controllers 107. The function of charcoal flow controllers 107 which are situated directly below the quaternary extension tubes 104 and tertiary tubes 106, is to determine the rate of charcoal flow through adsorption zones 16 and 17. Because the rate of solids flow through a vertical tube is almost exclusively proportional to the cross-section area open to solids flow, the determination of the rate of charcoal flow through both of the adsorption zones previously mentioned is easily accomplished by the design of the charcoal flow controllers 107 so that the cross-sectional area of the annular spaces between quaternary extension tubes 104 and the upper portion of charcoal flow controllers 107 is the same as the internal cross-sectional area of quaternary extension tubes 104. Thus, the rate at which charcoal flows out of adsorption zone 16 downward through tertiary tubes 102, quaternary tubes 103, extension tubes 104 and into charcoal flow controllers 107 is the same as the rate at which charcoal passes downward from adsorption zone 17 through the annular spaces of tertiary tubes 106 into charcoal flow controllers 107. The rich charcoal flowing downwardly through charcoal flow controllers 107, which are integrally attached to primary tray 101 of adsorption zone 18, continues to flow downward through adsorption zone 18 through extension tubes 108 attached by means of couplings 108a to the lower extremity of flow controllers 107. Extension tubes 108 extend downwardly through tertiary tubes 109, which are integrally attached to secondary tray 110, to a point on a level with tray 111. The rich charcoal formed in adsorption zone 18 flows downwardly through the annular spaces formed between extension tubes 108 and tertiary tubes 109, into engaging section 62 and onto tray 111. Charcoal flows through each of adsorption zones 16, 17 and 18 at substantially equal rates; therefore, the quantity of rich charcoal flowing downwardly through extension tubes 108 is substantially equal to twice the rate at which rich charcoal flows downwardly through adsorption zone 18 through the annular spaces formed between extension tubes 108 and tertiary tubes 109. Thus, in the design of charcoal flow controller 112 integrally attached to tray 111, the cross-sectional area of the annular spaces between the upper portion of charcoal flow controllers 112 and extension tubes 108 is made to be equal to one-half the cross-sectional area of extension tubes 108. The rate of charcoal flowing downward from adsorption zone 18 through tertiary tubes 109 and into charcoal flow controllers 112 is controlled by the cross-sectional area of the annular spaces in the controllers to a value which is equal to the rate at which charcoal flows through adsorption zones 16 and 17, or equal to one-half the rate at which charcoal flows downwardly through tubes analogous to extension tubes 108. The rate of charcoal flow from the lower portions of the charcoal flow controllers 112 and sealing legs 112a integrally attached to tray 111 is approximately three times the rate of charcoal flow through each adsorption zone and is equal to the rate of charcoal flow from zone 86 through primary tubes 99 attached to primary tray 68. An upward flow of desorbed methane and reflux countercurrent to the charcoal flow exists through charcoal flow controllers 112, and sealing legs 112a. A pressure drop in the upward direction is thereby produced and use is made of this in order to cause the flow of the desired quantity of reflux from sealing leg section 66 through line 31 controlled by valve 32 into venturi 9 which aids in forcing the reflux into line 30 wherein it is combined with the feed gas to form an enriched feed.

The charcoal flow controllers 107 on primary tray 101 and charcoal flow controllers 112 on tray 111 may be constructed in a variety of modifications, all of which are based upon the principle that the flow of small granular solids through an orifice or a tube is primarily dependent upon the cross-sectional area open to solids flow. The height of solids above the orifice or the lower opening of the tube exerts a negligible influence on the flow rate.

Referring more particularly to Figure 3 there is shown one modification of charcoal flow controllers 107 and 112. The indicating numerals shown therein refer particularly to charcoal flow controller 112, however, a similar construction may be used in charcoal flow controller 107 and any others included in installations where more than three adsorption zones are used. Extension tube 108 is shown extending downward through and integrally attached to tray 111. Tubes 124, which are also integrally attached to tray 111 and extend downward therefrom for a distance equal to the distance to which tube 108 extends downward from tray 111, are arranged around extension tube 108 in a regular geometrical pattern. Disposed between tubes 124 and extension tube 108 is baffle 120 which separates the charcoal flowing downwardly through tubes 124 from the adsorption zone immediately above, from the charcoal flowing downwardly through tube 108 which flows from other adsorption zones above that adsorption zone immediately above tray 111. Arranged around the vertical axis of tube 108 in substantially the same geometrical pattern are tubes 122 which are disposed between plate 121 and annular ring plate 123 so that the charcoal flowing downwardly through tubes 124 continues on through tubes 122 and the charcoal flowing downwardly through tube 108 fills the space below the annular ring plate 123—baffle 120 combination and plate 121. Interdisposed between tubes 122 at regular intervals are perforations 122a on plate 121 and which have diameters equal to the diameter of tubes 122 and through which flows the charcoal which enters the charcoal flow controller through tube 108. The two individual charcoal flows are here combined and flow downwardly through sealing leg 112a into rectification section 13 as previously described. The actual charcoal flow rate controlled through tube 108 is controlled by the total cross-sectional area of the perforations 122a in plate 121 which are interdisposed between tubes 122, and the charcoal flow rate through tubes 124 from the adsorption zone immediately above tray 111 is controlled by the internal cross-sectional area of tubes 122.

The function of sealing leg 112a is to provide a pressure drop between disengaging section 66 and engaging section 62 so that reflux may be removed from the rectification section and introduced into line 30 by means of venturi 9 as shown in Figure 2 to form an enriched feed. In order to accomplish this an upward flow of gas is maintained through sealing leg 112a which passes upward through plate 121 as shown in Figure 3, through tubes 121a, upward and around the upper portion of baffle 120, and upward through tubes 124 through tray 111 into the engaging and adsorption sections immediately above. In this manner the effect of the upwardly flowing gas upon the downwardly flowing carbon in flow controlling tubes 122 and perforations 122a is minimized. When applying this modification to a charcoal flow controller as shown as charcoal flow controller 112 in Figure 2, the ratio between the internal cross-sectional area of tubes 122 and the perforations 122a interdisposed in plate 121 between tubes 122 should be 1 to 2 because the charcoal flowing through the perforations 122a at a flow rate which is substantially twice as great as the flow rate through tubes 122 when equal charcoal flow rates through each adsorption zone is desired. In the case of charcoal flow controller 107 the ratio of the cross-sectional areas between tubes 122 and the perforations 122a in plate 121 disposed between tubes 122 should be 1 to 1. Obviously other modifications of the charcoal flow controller shown in Figure 3 may be utilized to control the ratio of charcoal or any granular solids flow by a suitable ratio of cross-sectional areas. It should be understood that this is merely one illustration of a construction suitable for the control of the ratio of solids flow and that other pieces of apparatus based upon the same principle are applicable as well.

The enriched charcoal removed from each of the adsorption zones disposed in the multiple tray adsorption section is combined in charcoal flow controllers 112 attached to tray 111 with the attached sealing leg shown which extend downward from tray 111 and forms disengaging and sealing leg section 66. The enriched charcoal flows downwardly from the lower portion of the charcoal flow controllers through rectification section 13, and through rich gas disengaging section 67. The drawing shows two rectification sections, namely 13 and 13a, to provide for removal of a side-cut if desired, as explained below; but it is to be understood that if no side-cut is desired, section 13a with its disengaging section including 113a, 114a, 67a, 70a and 71a may be omitted or not used. Rich gas disengaging section comprises tray 113 to which are integrally attached tubes 114. The rich charcoal flowing through disengaging section 67 flows through steaming section 14 and downward through the tubes of desorption section 15. The rich charcoal passing therethrough is heated by indirect heat exchange and contacted with a countercurrent stream of a stripping gas such as for example steam, thereby causing the desorption from the rich charcoal of the adsorbed constituents contained thereon. The mechanism of desorption and rectification has previously been described in conjunction with the description of rectification section 13, steaming section 14 and desorption section 15 shown in Figure 1.

It is to be understood in consideration of the description of the illustrations just described that any number of adsorption zones may be included within the multiple tray adsorption section to which my invention is directed, and the fact that three adsorption zones have been described must not be taken as limiting my invention. Multiple tray adsorption sections may be constructed containing as few as two and as many as four or more adsorption zones, depending upon the particular installation and the particular type of gaseous mixture which it is desired to separate.

Should fractionation of the rich gas containing ethane, propane, butanes and heavier be desirable, a second rectification section may be included above the desorption section which will permit a separation between any two of the constituents of the rich gas. Such a rectification zone would be situated above the rich gas disengaging section 67. The enriched charcoal flows through the feed gas engaging section into the first rectification section 13a. Here any adsorbed methane is desorbed by contacting the charcoal with a stream of ethane or heavier hydrocarbons which are desorbed from the charcoal in the second rectification section 13 wherein the charcoal is contacted with a reflux of propane or heavier hydrocarbons. The rich gas under these conditions of operation would consist of propane and heavier hydrocarbons while the side cut removed from a disengaging section 67a below the feed engaging section would comprise the ethane and minor amounts of methane and $C_3$ contaminants. Plate 113a and tubes 114a form the disengaging section 67a from which the side-cut is withdrawn through line 70a and valve 71a. A higher degree of fractionation may be obtained with more complex gaseous mixtures by inclusion of a multiplicity of rectification sections for producing a plurality of streams with differing compositions. The operation of such a system is obvious from the foregoing description.

It is to be understood, however, that this specific separation is used here only for purposes of description and that my invention is applicable with advantage to any gaseous mixture in which the higher molecular weight, more readily adsorbable constituents are present in relatively small concentrations, that is to say, less than about 30 volume per cent.

For application to the continuous selective adsorption process as herein described, I prefer activated granular charcoal with granules ranging from 10 to 14 mesh in size. However, I do not wish to be limited thereby, because in certain specific applications granules as large as about 2 mesh are applicable and in some cases powdered charcoals as fine as about 500 mesh may be used.

A modification also exists in the manner in which the granular adsorbent is conveyed from the bottom of one tower to the top of the other. Elevator means may be applied to move the adsorbent, but in view of the difficulties of maintenance and operation at elevated pressures, the use of the gas lift system shown in the example is to be preferred.

It is to be understood that the present invention resides primarily in an improved selective adsorption process and apparatus whereby gaseous mixtures containing relatively small amounts of the higher molecular weight constituents, for example, from traces of these components to about 30 volume per cent, may be efficiently and conveniently separated without the disadvantages inherent in conventional separation processes. Thus, any modification may be made in the particular method in which the adsorption, pretreatment, or subsequent treatment is carried out without departing from the basic invention herein disclosed.

The multiple-tray adsorption apparatus of my invention performs equally as well with other solid adsorbents such as silica gel, activated alumina, various adsorbents formed from iron and chromium oxides, the zeolites, etc., as it does with charcoal, and my invention is, therefore, independent of the type or character of the adsorbent used.

Having described and illustrated my invention and realizing that many modifications thereof may occur to those skilled in the art without departing from the spirit or scope of my invention, I claim:

1. A process for the continuous separation of a gaseous mixture by selective adsorption which comprises simultaneously contacting said gaseous mixture with a moving bed of granular solid adsorbent flowing downwardly through each of a multiplicity of separate adsorption zones, adsorbing on said adsorbent in each of said separate adsorption zones the more readily adsorbable constituents of said gaseous mixture to form a rich adsorbent, removing from each of said adsorption zones the less readily adsorbable constituents of said gaseous mixture as a lean gas, flowing said rich adsorbent from each of said separate adsorption zones to a desorption zone, desorbing from said rich adsorbent therein the more readily adsorbable constituents of said gaseous mixture, and removing the thus desorbed constituents from said desorption zone as a rich gas.

2. A process for the continuous separation of a gaseous mixture containing constituents of varying adsorbability by selective adsorption which comprises simultaneously contacting said gaseous mixture with a downwardly moving bed of granular solid adsorbent in each of a multiplicity of separate adsorption zones, adsorbing on said adsorbent in each of said separate adsorption zones the more readily adsorbable constituents of said gaseous mixture to form a rich adsorbent, removing from each of said separate adsorption zones the less readily adsorbable constituents of said gaseous mixture which are substantially unadsorbed to form a lean gas, flowing said rich adsorbent from each of said separate adsorption zones to a desorption zone, desorbing from said rich adsorbent therein the adsorbed constituents contained on said adsorbent to form a rich gas and a lean adsorbent, removing said rich gas from said desorption zone, removing said lean adsorbent from said desorption zone, and returning the removed lean adsorbent to each of said separate adsorption zones.

3. A process for the continuous separation of a normally gaseous mixture containing constituents of varying adsorbability by selective adsorption which comprises continuously flowing a granular solid adsorbent downwardly by gravity successively through a cooling zone, simultaneously through each of a multiplicity of separate adsorption zones, and a desorption zone, introducing fractions of said gaseous mixture into each of said multiplicity of separate adsorption zones, adsorbing in each of said adsorption zones on the downwardly flowing adsorbent the more readily adsorbable constituents of said gaseous mixture to form a rich adsorbent, removing as a lean gas from each of said separate adsorption zones the less readily adsorbable constituents of said gaseous mixture as a substantially unadsorbed gas, flowing said rich adsorbent downwardly from each each of said multiplicity of separate adsorption zones to said desorption zone, desorbing therein the more readily adsorbable constituents of said gaseous mixture adsorbed on said adsorbent to form a rich gas and a lean adsorbent, removing said rich gas from said desorption zone, removing said lean adsorbent from said desorption zone, and returning the removed lean adsorbent through said cooling zone to each of said multiplicity of separate adsorption zones.

4. A process according to claim 1 in which said granular solid adsorbent comprises charcoal.

5. A process according to claim 2 in which said granular solid adsorbent comprises charcoal.

6. A process according to claim 3 in which said granular solid adsorbent comprises charcoal.

7. A process for the continuous separation of a gaseous mixture containing constituents of varying degrees of adsorbability by selective adsorption which comprises flowing charcoal downwardly by gravity successively through a cooling zone and simultaneously into each of a multiplicity of separate adjacent adsorption zones, combining said gaseous mixture with a portion of a reflux of more readily adsorbable gas to form an enriched feed, introducing a fraction of said enriched feed into each of said multiplicity of adsorption zones, adsorbing therein the more readily adsorbable constituents of said enriched feed to form a rich charcoal, removing from each of said multiplicity of adsorption zones as a lean gas the less readily adsorbable constituents of said gaseous mixture as a substantially unadsorbed gas, flowing said rich charcoal from each of said multiplicity of adsorption zones downwardly to a desorption zone, heating therein said rich charcoal while contacting said rich charcoal with a stripping gas, desorbing thereby the more readily adsorbable constituents adsorbed thereon to form a rich gas and a lean adsorbent, removing rich gas from said desorption zone, and conveying said lean charcoal from said desorption zone through said cooling zone to each of said multiplicity of adsorption zones.

8. An apparatus for the continuous separation by selective adsorption of gaseous mixtures containing relatively small amounts of the more readily adsorbable constituents which comprises an adsorption column provided with a cooling section, an adsorption section, and a desorption section, said adsorption section containing a multiplicity of superimposed separate adjacent adsorption zones, means for passing a separate portion of said solid adsorbent simultaneously through each of said adsorption zones, and means for combining the separate portions from each of said zones for passage through said desorption and cooling sections.

9. An apparatus for the continuous separation by selective adsorption on a granular solid adsorbent of a gaseous mixture containing relatively small amounts of the more readily adsorbable constituents which comprises an adsorption column provided with a cooling section near the top thereof, and successively therebelow, an adsorption section, and a desorption section, said adsorption section comprising a multiplicity of superimposed adjacent separate adsorption zones, means for introducing a portion of lean adsorbent from the cooling section into each of said adsorption zones in said adsorption section, means for introducing a fraction of said gaseous mixture into each of said adsorption zones thereby adsorbing the more readily adsorbable constituents of said gaseous mixture on said adsorbent to form a rich adsorbent, means for separating a lean gas containing the less readily adsorbable constituents of said gaseous mixture as a substantially unadsorbed gas from each of said adsorption zones, means for removing said rich adsorbent from each of said adsorption zones at a controlled rate, means for combining the rich adsorbent removed from each of said adsorption zones and passing the combined adsorbent to the desorption section, means for removing from said desorption section a rich gas comprising the more readily adsorbable constituents desorbed therein from said rich adsorbent to form a lean adsorbent, means for removing said lean adsorbent from said desorption section, means for suspending the removed lean adsorbent in a lift gas comprising a part of said lean gas, means for conveying the suspension of said lean gas and said lean adsorbent to separating means disposed above said cooling section, and means for conducting said lean adsorbent from said separating means to said cooling section wherein said lean adsorbent is cooled prior to introduction into said adsorption section.

10. An apparatus for the continuous separation by selective adsorption on a granular solid adsorbent of a gaseous mixture containing constituents of varying degrees of adsorbability and containing relatively small amounts of the more readily adsorbable constituents which comprises an adsorption column provided with a cooling section, an adsorption section, at least one rectification section and a desorption section, said adsorption section comprising a multiplicity of separate adjacent adsorption zones disposed together in vertical relationship in said adsorption section and arranged so as to substantially eliminate the flow of gas from one zone to the zones adjacent, means in each of said multiplicity of adsorption zones for introducing a lean adsorbent, means for combining at least a portion of a reflux gas containing said more readily adsorbable constituents with said gaseous mixture to form an enriched feed, means for dividing said enriched feed into a multiplicity of fractions, means for introducing said fractions of said enriched feed into each of the multiplicity of adsorption zones disposed in said adsorption section thereby adsorbing the more readily adsorbable constituents of said fraction of said enriched feed on said adsorbent to form a rich adsorbent, means for removing from each of said multiplicity of adsorption zones a fraction of lean gas containing the less readily adsorbable constituents of said fraction of said enriched feed as a substantially unadsorbed gas, means for the removal of said rich adsorbent from each of said multiplicity of adsorption zones, means for combining the rich adsorbent thus removed from each of said multiplicity of adsorption zones so as to control the rate of adsorbent flow through each of said adsorption zones, means for removing from said rectification section relatively small amounts of the less readily adsorbable constituents of said gaseous mixture contained in said rich adsorbent and desorbed from said rich adsorbent in said rectification zone by contacting said rich adsorbent therein with additional quantities of the more readily adsorbable constituents of said gaseous mixture, means for removing from said desorption section a rich gas comprising the most readily adsorbable constituents desorbed therein by heating said rich adsorbent and contacting said rich adsorbent with a stripping gas to form a lean adsorbent, transfer means for removing said lean adsorbent from said desorption section, means for combining a portion of said lean gas with said lean adsorbent removed from said desorption section to form a lean gas-lean adsorbent suspension, separating means positioned above said cooling section to separate said lean adsorbent from said lean gas in said suspension, connecting means connecting said transfer means with said separating means, means connecting said separating means with the top of said adsorption column whereby the lean adsorbent separated in said separating means is returned to said cooling section, and means for dividing the cooled lean adsorbent into a multiplicity of fractions prior to the introduction of each fraction of said cooled lean adsorbent into each of said multiplicity of said adsorption zones.

11. A process according to claim 3 in which a portion of the lean gas from one of said adsorption zones is passed through said cooling zone countercurrent to the adsorbent therein.

12. A process according to claim 3 in which adsorbent from at least two of the adsorption zones is passed through a control zone in which the adsorbent flow from each zone is controlled by passing the adsorbent through constrictions of fixed area, and a gas flow is passed through the control zone countercurrent to the adsorbent without passing through said constrictions.

13. A process for the separation of a gaseous mixture by selective adsorption on a solid adsorbent which comprises passing said adsorbent successively through a cooling zone, simultaneously through each of a multiplicity of separate adsorption zones, a sealing zone, a rectification zone, and a desorption zone, passing separate portions of said gaseous mixture through each of said adsorption zones, separately removing unadsorbed gas from each of said adsorption zones, desorbing adsorbed gas from the adsorbent in said desorption zone, withdrawing a portion of the said desorbed gas and returning another portion to said rectification zone to act as internal reflux therein and serve to desorb a less readily adsorbable reflux gas fraction, removing the latter reflux gas from the rectification zone and combining at least a portion thereof with the gaseous mixture introduced into each adsorption zone.

14. A process for the continuous separation of a gaseous mixture containing constituents of varying degrees of adsorbability by selective adsorption on a solid adsorbent which comprises flowing said adsorbent successively through a cooling zone, simultaneously through each of a multiplicity of separate adjacent adsorption zones, a rectification zone and a desorption zone, combining said gaseous mixture with a reflux to from an enriched feed, dividing the enriched feed into a number of substantially equal fractions, introducing each of said fractions into each of said adsorption zones, contacting therein each of said fractions with a moving stream of adsorbent and thereby adsorbing the more readily adsorbable constituents of said fractions thereon to form a rich adsorbent, removing from each of said adsorption zones a lean gas comprising less readily adsorbable constituents of said fraction of said gaseous mixture as a substantially unadsorbed gas, combining the rich adsorbent from each of said adsorption zones, flowing the combined adsorbent through the rectification zone to the desorption zone, heating the rich adsorbent therein while simultaneously contacting it with a stripping gas and thereby desorbing the more readily adsorbable constituents of the gaseous mixture adsorbed thereon to form a rich gas and a lean adsorbent, removing a portion of the rich gas from the desorption zone, returning another portion of the rich gas to said rectification zone to act as internal reflux therein and serve to desorb a less readily adsorbable reflux gas fraction, and removing the latter reflux gas fraction from the rectification zone and employing at least a portion of it as said reflux gas.

15. A process according to claim 14 in which the solid adsorbent is charcoal.

16. A process according to claim 14 wherein said stripping gas comprises steam maintained in said desorption zone as an internal stripping steam recycle stream.

17. A process according to claim 14 wherein said more readily adsorbable constituents of said gaseous mixture comprise less than about 30 volume per cent of said gaseous mixture.

18. A process according to claim 14 wherein said more readily adsorbable constituents of said gaseous mixture comprise less than about 15 volume per cent of said gaseous mixture.

19. An apparatus for the continuous separation by selective adsorption of a gaseous mixture containing relatively small amounts of more readily adsorbable constituents which comprises an adsorption column provided with a cooling section, an adsorption section, and a desorption section, said adsorption section being provided with a multiplicity of superimposed separate adjacent adsorption zones, means in each of said adsorption zones for introducing a fraction of said gaseous mixture, means in each of said adsorption zones for removing a lean gas fraction consisting of a fraction of the less readily adsorbable constituents of said fraction of said gaseous mixture, means for passing a solid adsorbent through said column continuously, simultaneously and at the same rate through each of said adsorption zones, and means for passing lean gas from one of said adsorption zones through said cooling zone.

20. An apparatus for the continuous separation by selective adsorption on granular solid adsorbents of gaseous mixtures containing constituents of varying degrees of adsorbability and containing relatively small amounts of the more readily adsorbable constituents which comprises an adsorption column provided with a cooling section, an adsorption section, a rectification section, and a desorption section, said adsorption section being provided with a multiplicity of separate adjacent adsorption zones, means in each of said adsorption zones for introducing a lean adsorbent, means in each of said adsorption zones for introducing a fraction of said gaseous mixture, means for removing from each of said adsorption zones a fraction of a lean gas containing a fraction of the less readily adsorbable constituents of said gaseous mixture, means for transferring to the rectification section from each of said multiplicity of adsorption zones a rich adsorbent containing the more readily adsorbable constituents adsorbed thereon, means for removing from said rectification section a small amount of reflux comprising less readily adsorbable constituents desorbed from said rich adsorbent therein, means for mixing the removed reflux with said gaseous mixture before introducing said gas into said adsorption zones, means for removing from said desorption section a rich gas comprising the more readily adsorbable constituents desorbed from said rich adsorbent, and means for returning a portion of said rich gas to said rectification section to desorb said reflux therein.

21. An apparatus for the continuous separation of a gaseous mixture by selective adsorption on a granular solid adsorbent which comprises an adsorption column provided with a cooling section, an adsorption section, a rectification section, and a desorption section together with disengaging sections disposed between said sections to permit the introduction or removal of gases therethrough, feeding means for introducing said gaseous mixture into said adsorption section, means for removing unadsorbed gas from said adsorption section, means for removing desorbed gas from said desorption section, means for removing a gaseous reflux from said rectification section and mixing it with the gaseous mixture in said feeding means, sealing means for preventing substantial gas flow between said adsorption section and said rectification section, means for circulating the adsorbent in a solid moving bed successively through the above sections of said adsorption column, and means for controlling the rate of circulation at a single point in the lower part of the column, said adsorption section comprising a multiplicity of separate adjacent adsorption zones, means in each of said adsorption zones for introducing a portion of said gaseous mixture introduced into said adsorption section, means in each of said adsorption zones for removing unadsorbed gas as a lean gas from said adsorption section, means in each of said adsorption zones for introducing lean absorbent thereinto directly from said cooling section, and means in each of said adsorption zones for removing therefrom rich adsorbent and passing it directly to the sealing means.

22. An apparatus for the separation of a gaseous mixture by selective adsorption on a solid adsorbent which comprises a column containing a multiplicity of adsorption zones disposed vertically therein, a horizontal primary tray at the top of each adsorption zone, a horizontal secondary tray at the bottom of each adsorption zone, a series of vertically disposed primary tubes depending from each of said primary trays except the lowermost so as to form a gas disengaging zone, a series of vertically disposed secondary tubes of smaller diameter than said primary tubes and disposed in the same vertical axis, said secondary tubes passing through each of said zones except the lowermost, and extending upward into the primary tubes of the adjacent adsorption zone and downward to the primary tray of the next lower adsorption zone so that one portion of adsorbent may flow through the primary tray and its primary tube into the adjacent adsorption zone while another portion of adsorbent flows through the secondary tube into a lower adsorption zone, and the lowermost of said secondary tubes extending through the primary tray of the lowermost adsorption zone so as to provide a gas disengaging zone, a series of vertically disposed tertiary tubes depending from each of said secondary trays so as to form a gas engaging zone, a series of quaternary tubes of smaller diameter than said tertiary tubes and disposed in the same vertical axis, said quaternary tubes depending from the primary tray of each of said adsorption zones except the uppermost and the lowermost and extending downward to the primary tray of the next lower adsorption zone, a series of adsorbent flow controllers depending from each of said primary trays except the two uppermost, and having the same vertical axis as said tertiary tubes, each controller being adapted to receive and control the flow of adsorbent through the quaternary tube and the tertiary tube immediately above it, a series of extension tubes depending from said flow controllers and extending through the adjacent adsorption zone, the extension tubes in the lowermost adsorption zone extending through the secondary tray thereof to another series of adsorbent flow controllers depending from a tray therebelow, the latter controllers being adapted to receive and control the flow of adsorbent through said extension tubes and also through the tertiary tubes of the secondary tray of said lowermost adsorption zone, feeding means for introducing said gaseous mixture into each of said engaging zones, means for removing unadsorbed gas from each of said disengaging zones, means for removing reflux gas from below the tray below the secondary tray of the lowermost adsorption zone, and means for controlling the combined flow of adsorbent from all of the adsorption zones at a single point below said adsorption zones in the column.

23. A flow controller for controlling the rate of flow of each of two streams of solid adsorbent flowing downwardly therethrough by passing each stream separately through a flow control means of constricted area, while permitting an upflow of gas through the controller but not through said flow control means of constricted areas, which comprises a horizontal upper tray, a vertical shell attached to the lower side thereof, an intermediate tray and a lower tray within said shell, a central adsorbent inlet for one stream of adsorbent, said central inlet passing through said upper tray to a point above said intermediate tray, a baffle extending upward from said intermediate tray to a point above the lower end of said central inlet and surrounding said inlet so as to permit separate passage of the adsorbent from the central inlet through the zone between the upper and intermediate trays and into the zone between the intermediate and lower trays, flow control openings dispersed in a geometrical pattern in the lower tray to permit controlled passage of adsorbent therethrough, a series of secondary inlet tubes disposed in a geometrical pattern around said central inlet, said secondary inlet tubes depending from said upper tray and extending to a point above the intermediate tray, flow control tubes having the same vertical axis as said secondary inlet tubes, for passing the adsorbent admitted through said secondary inlet tubes from above the intermediate tray separately through the zone between the intermediate tray and the lower tray and through the lower tray, and gas by-pass tubes extending upward from the lower tray to a point below the upper tray but above the lower ends of the secondary inlet tubes.

CLYDE H. O. BERG.

REFERENCES CITED

The following references are of record in the file of this patent:

UNITED STATES PATENTS

| Number | Name | Date |
|---|---|---|
| 1,422,007 | Soddy | July 4, 1922 |
| 1,702,311 | Pantenburg | Feb. 19, 1929 |
| 1,825,707 | Wagner | Oct. 6, 1931 |
| 1,836,301 | Bechthold | Dec. 15, 1931 |
| 2,349,098 | Kiesskalt | May 16, 1944 |
| 2,384,311 | Kearby | Sept. 4, 1945 |